United States Patent Office 2,821,482
Patented Jan. 28, 1958

2,821,482

METHOD OF PROCESSING AND CANNING PIGEON PEAS AND THE LIKE

Ferdinand Sánchez Nieva, Rio Piedras, Puerto Rico, assignor to the People of Puerto Rico No Drawing. Application November 30, 1956
Serial No. 625,214

3 Claims. (Cl. 99—186)

This invention relates broadly to the preparation of legumes for human consumption and, more particularly, to processes for preparing and canning pigeon peas and like legumes.

In accordance with known practise prior to this invention pigeon peas (*Cajanus indicus*) have been processed for canning in the same manner and by the same method as peas (*Pisum sativum*). While this known process is entirely satisfactory for the canning of peas it has been found that when it is used in the canning of pigeon peas and certain other legumes the brine in which the pigeon peas or other legumes are canned becomes very dark and almost black and has very high turbidity. The darkening of the brine and the presence of starch granules in it has been found to result in a lowering of the quality of the canned product.

It has been the principal object of this invention to provide an improved method of processing pigeon peas, and those other legumes which present the same problems in processing for canning, which will prevent the darkening and high turbidity of the brine and will thus provide an improved canned product not having the disadvantages of products canned by known processes. This principal object of the invention is achieved by the method described and claimed in this application and it has been found that advantages other than, and in addition to, the improvement of the brine and the resulting improvement of the product, are provided by and result from the practise of the method according to the invention. Thus, it has been found that canning in accordance with the invention results in increased yield of peas, reduction in the percentage of mashed units, improvement in the removal of worms to substantially 100% elimination, increase in the output of the hulling machines, and reduction in the picking operation. All of these considerable and important advantages result from the improved process provided by this invention, which is described in the following specification and defined in the appended claims.

Until the present invention, pigeon peas and similar legumes have been processed for canning in the same way as peas. This known processing consists in shelling the peas, size grading the peas, picking to remove debris, pieces of pod, trash and the like, washing, blanching the pigeon peas, cooling, filling into cans, processing the canned pigeon peas, and finally cooling. The blanching step may be performed satisfactorily by immersing the pigeon peas in hot water at 180° F. for five minutes, the canned pigeon peas may be processed by heating at 240° F. for thirty-five minutes, and the succeeding cooling step may be performed at 100° F. As stated, very serious defects in the canned product have been found when this usual process for canning peas is used in the canning of pigeon peas.

In accordance with the present invention the described known process of canning pigeon peas and similar legumes is modified by the addition of certain steps with the resulting advantages which are described herein. In the improved process according to this invention the pods are heated, before hulling or any other operation, to a temperature sufficient to inactivate the peroxidase enzymes of the peas, which condition may be determined by a negative guaiacol-hydrogen peroxide peroxidase test. This step may be satisfactorily performed by steaming the pods at atmospheric pressure for 1½ minutes. Immediately after this heating step the peas are shelled and then the peas are rapidly cooled. This may be performed satisfactorily by fluming the pigeon peas from the huller to a washer which is preferably of the rod-reel type. The peas from the rod reel washer are size graded and picked, and the picked peas are then washed. After washing, the peas are blanched, which may be performed in water at 180° F. for five minutes. The peas are then rapidly cooled and are then packed in cans with a 2% brine solution and processed at 240° F. for thirty-five minutes.

It will be seen that the usual and known method of canning peas is modified by the present invention in two respects to provide an improved product and other advantages when pigeon peas and similar legumes are canned. These two steps are the pre-heating of the unshelled pods and the cooling of the peas after shelling, and all steps of the method provided by the invention after these pre-heating and cooling steps are conventional.

An immediate and important result of the processing of pigeon peas by the method according to this invention is an increase in the yield of usable peas from a given number of pods. Thus, it has been found in a series of controlled tests that the total recovery of peas after two shellings in a conventional processing not according to this invention varied between 39.0 and 49.6 pigeon peas per hundred pods. However, when the peas were processed in accordance with this invention, with two shellings immediately following the pre-heating step, the recovery of peas was from 38.6 to 58.7 peas per hundred pods. Further, the percentage of mashed units was found to be greatly reduced after processing in accordance with this invention. Processing by conventional methods resulted in 8.0 to 13.1 mashed units per 100 peas, while processing by the present invention resulted in 1.9 to 4.3 mashed units per 100 peas. The reduction in the number of mashed units by the use of the new method results in an increase in the yield of peas and also reduces the load on the picking tables, as fewer mashed units will have to be removed in this operation. The increase in the recovery of peas from the shelling operation plus the reduction in the number of rejects due to mashed units thus results in a substantial increase in the yield of peas. The increase in yield which results from the practise of the invention will alone offset any increase in operating expense resulting from the use of the pre-heating process in the canning of pigeon peas.

In following the conventional practise the pigeon peas are shelled and then cleaned and size graded in a cleaner by an operation which removes small peas, debris, pieces of pod and trash. Worms are not effectively removed and the cleaned peas must be hand picked to remove defective units and worms. In conventional canning practise it has been found to be almost impossible to remove worms completely even by the most careful picking operation and even subsequent washing of the peas does not remove all of the worms.

In the method according to the invention, after shelling pre-heated pods the hot peas are flumed to a rod reel washer the rods of which may be spaced 5/16". When the peas flow through the washer, small peas as well as pieces of pods, worms and other debris are effectively removed. The peas coming from the washer are much cleaner than those obtained by the conventional method.

Worm removal has been found to be 100% effective when the pods are pre-heated in accordance with this invention as the worms elongate in the pre-heating and pass readily between the rods of the rod reel washer. In all lots of peas processed by this new method no worms have had to be removed at the picking table; while when peas were processed by the conventional method complete worm removal could never be obtained even after the most careful picking.

Pigeon peas canned by the method of this invention are superior in quality to those canned by the conventional method. This improved quality is the result of the almost colorless and transparent brine, of low turbidity, which results when the pods are pre-heated before shelling. The colorless and transparent quality of the brine, and its low turbidity, are proved by visual inspection and by color and turbidity measurements using the Clett-Summerson Colorimeter and the Hunter Color Difference Meter. The improved quality of peas processed for canning by the method of this invention has been established by panels of tasters using the pair test. These tests show pigeon peas processed by this invention to have better appearance in the can, better appearance of the drained peas, a greater percentage of more tender peas, more attractive color, and better flavor.

It will be understood that while the invention is particularly useful in the processing of pigeon peas for canning, and is so described herein, it is also useful in the processing of other legumes such as lima beans, black-eye peas, chowder peas and the like. It will also be understood that the values of temperature and time given herein in describing the invention are not entirely critical and may be varied within limits which permit the intended results of the invention to be achieved. It will therefore be apparent to those skilled in the art that modifications of the disclosed method and the various steps thereof may be made and practised without departing from the invention, the limits of which are defined only by the appended claims.

What is claimed is:

1. The method of processing pigeon peas for canning which includes the steps of heating the pods before shelling to a temperature sufficient to inactivate the peroxidase enzymes of the peas, then shelling the pods and cooling the peas.

2. The method of processing pigeon peas for canning which includes the steps of steaming the pods at atmospheric pressure and before shelling to a temperature sufficient to inactivate the peroxidase enzymes of the peas, then shelling the pods and cooling the peas.

3. The method of canning pigeon peas which comprises heating the pods before shelling to a temperature sufficient to inactivate the peroxidase enzymes of the peas, shelling the heated pods before cooling, cooling the shelled peas, blanching the peas, canning the peas in a brine solution, and processing the canned peas.

References Cited in the file of this patent

UNITED STATES PATENTS

| 969,238 | Wright | Sept. 6, 1910 |
| 1,937,851 | Stansbury | Dec. 5, 1933 |